(12) United States Patent
Hegazy et al.

(10) Patent No.: US 12,549,343 B2
(45) Date of Patent: Feb. 10, 2026

(54) QUANTUM KEY DISTRIBUTION SYSTEM TO OVERCOME INTERCEPT-RESEND AND DETECTOR-CONTROL QUANTUM HACKING

(71) Applicant: University of Central Florida Research Foundation, Inc., Orlando, FL (US)

(72) Inventors: Salem F. Hegazy, Giza (EG); Bahaa E. A. Saleh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 154 days.

(21) Appl. No.: 18/597,258

(22) Filed: Mar. 6, 2024

(65) Prior Publication Data

US 2025/0007702 A1     Jan. 2, 2025

Related U.S. Application Data

(63) Continuation-in-part of application No. 18/093,723, filed on Jan. 5, 2023, now Pat. No. 11,962,690.
(Continued)

(51) Int. Cl.
*H04L 9/08*     (2006.01)

(52) U.S. Cl.
CPC .......... *H04L 9/0858* (2013.01); *H04L 9/0819* (2013.01)

(58) Field of Classification Search
CPC ............................ H04L 9/0858; H04L 9/0819
(Continued)

(56) References Cited

U.S. PATENT DOCUMENTS

| | | | |
|---|---|---|---|
| 9,071,425 | B2 * | 6/2015 | Yuan ...................... H04B 10/70 |
| 10,020,937 | B2 | 7/2018 | Legre et al. |

(Continued)

FOREIGN PATENT DOCUMENTS

| | | |
|---|---|---|
| CN | 1672171 A | 9/2005 |
| CN | 1989447 A | 6/2007 |

(Continued)

OTHER PUBLICATIONS

Braunstein, Samuel L. et al., "Side-channel-free quantum key distribution." Physical review letters 108.13 (2012): 130502.
(Continued)

*Primary Examiner* — Aubrey H Wyszynski
(74) *Attorney, Agent, or Firm* — Suiter Swantz IP

(57) ABSTRACT

A quantum key distribution system may include a transceiver including a state randomizer to impart a random state transformation to one or more qubits of a generated faint pulse and a quantum bit encoder to reflect the faint pulse back to the transceiver with one or more encoded bits. The transceiver may receive a return pulse through the communication channel, where the state randomizer reverses the random state transformation. The transceiver may include a set of two detectors to measure the return pulse at time-gated timeslots associated with possible paths of the return pulse. Reception of the faint pulse from the quantum bit encoder as the return pulse triggers a detector in one or more known time-gated timeslots determined based on the random state transformation, while reception of a faked-state pulse results in a non-zero probability of triggering of a detector in a different time-gated timeslot.

21 Claims, 9 Drawing Sheets

Related U.S. Application Data

(60) Provisional application No. 63/296,711, filed on Jan. 5, 2022.

(58) Field of Classification Search
USPC .......................................................... 380/278
See application file for complete search history.

(56) References Cited

U.S. PATENT DOCUMENTS

| | | | |
|---|---|---|---|
| 11,451,308 B1* | 9/2022 | Bucklew | H04B 10/60 |
| 2020/0067704 A1* | 2/2020 | Zbinden | H04B 10/07953 |
| 2021/0133614 A1 | 5/2021 | Ashrafi | |

FOREIGN PATENT DOCUMENTS

| | | |
|---|---|---|
| KR | 20230066344 A | 5/2023 |
| WO | 2004105289 A2 | 12/2004 |
| WO | 2012046135 A2 | 4/2012 |
| WO | 2021090024 A1 | 5/2021 |
| WO | 2022039818 A2 | 2/2022 |
| WO | 2022092815 A1 | 5/2022 |
| WO | 2022124606 A1 | 6/2022 |

OTHER PUBLICATIONS

Bugge, Audun Nystad, et al. "Laser damage helps the eavesdropper in quantum cryptography." Physical review letters 112.7 (2014): 070503.

Da Silva, Thiago Ferreira, et al. "Real-time monitoring of single-photon detectors against eavesdropping in quantum key distribution systems." Optics express 20.17 (2012): 18911-18924.

Gerhardt, Ilja, et al. "Full-field implementation of a perfect eavesdropper on a quantum cryptography system." Nature communications 2.1 (2011): 1-6.

Hegazy, Salem F., Salah SA Obayya, and Bahaa EA Saleh. "Randomized ancillary qubit overcomes detector-control and intercept-resend hacking of quantum key distribution." Journal of Lightwave Technology 40.21 (2022): 6995-7005.

Huang, Anqi, et al. "Testing random-detector-efficiency countermeasure in a commercial system reveals a breakable unrealistic assumption." IEEE Journal of Quantum Electronics 52.11 (2016): 1-11.

Lim, Charles Ci Wen, et al. "Random variation of detector efficiency: A countermeasure against detector blinding attacks for quantum key distribution." IEEE Journal of Selected Topics in Quantum Electronics 21.3 (2015): 192-196.

Lo, Hoi-Kwong, et al., "Measurement-device-independent quantum key distribution." Physical review letters 108.13 (2012): 130503.

Lydersen, L., et al., Thermal blinding of gated detectors in quantum cryptography. Opt. express 18, 27938-27954 (2010).

Lydersen, Lars, et al. "Hacking commercial quantum cryptography systems by tailored bright illumination." Nature photonics 4.10 (2010): 686-689.

Lydersen, Lars, et al. "Superlinear threshold detectors in quantum cryptography." Physical Review A 84.3 (2011): 032320.

Qian, Yong-Jun, et al. "Robust countermeasure against detector control attack in a practical quantum key distribution system." Optica 6.9 (2019): 1178-1184.

Sauge, Sebastien, et al. "Controlling an actively-quenched single photon detector with bright light." Optics Express 19.23 (2011): 23590-23600.

Stucki, Damien, et al. "Quantum key distribution over 67 km with a plug&play system." New Journal of Physics 4.1 (2002): 41.

Wiechers, Carlos, et al. "After-gate attack on a quantum cryptosystem." New Journal of Physics 13.1 (2011): 013043.

Wu, Zhihao, et al. "Hacking single-photon avalanche detectors in quantum key distribution via pulse illumination." Optics Express 28.17 (2020): 25574-25590.

Wu, Zhihao, et al. "Robust countermeasure against detector control attack in a practical quantum key distribution system: comment." Optica 7.10 (2020): 1391-1393.

Xu, Feihu, et al. "Secure quantum key distribution with realistic devices." Reviews of Modern Physics 92.2 (2020): 025002.

Yuan, Z. L., J. F. Dynes, and A. J. Shields. "Resilience of gated avalanche photodiodes against bright illumination attacks in quantum cryptography." Applied physics letters 98.23 (2011): 231104.

Yuan, Z. L., James F. Dynes, and Andrew J. Shields. "Avoiding the blinding attack in QKD." Nature Photonics 4.12 (2010): 800-801.

* cited by examiner

QUANTUM KEY DISTRIBUTION SYSTEM TO OVERCOME INTERCEPT-RESEND AND DETECTOR-CONTROL QUANTUM HACKING

CROSS-REFERENCE TO RELATED APPLICATION

The present application is a continuation in part of U.S. patent application Ser. No. 18/093,723 filed on Jan. 5, 2023, which claims the benefit under 35 U.S.C. § 119(e) of U.S. Provisional Application Ser. No. 63/296,711 filed Jan. 5, 2022; both of which are incorporated herein by reference in the entirety.

TECHNICAL DESCRIPTION

The present disclosure relates generally to quantum key distribution (QKD) communications and, more particularly, to QKD providing immunity from adversarial threats.

BACKGROUND

The unconditional security offered by quantum key distribution (QKD) relies on laws of quantum physics, which dictate that any attempt by an adversary to know about the secret key, would inevitably introduce disturbance that alerts the legitimate parties. This ultimate information-theoretic security has been proved for idealized devices. In practice, however, real-life components of QKD systems may deviate from these idealized models, or encounter new scenarios offering vulnerabilities to the adversary. Most notable is a general class of attacks adopting faked-state photons, as in the detector-control and more broadly the intercept-resend attacks. There is therefore a need to develop systems and methods to cure the above deficiencies.

SUMMARY

In embodiments, the techniques described herein relate to a system including a transceiver including a light source configured to generate a faint pulse; a state randomizer configured to impart a random state transformation to one or more qubits associated with the faint pulse prior to transmission of the faint pulse over a communication channel; a quantum bit encoder including a modulator configured to encode one or more encoded bits on the faint pulse received over the communication channel; and a mirror to reflect the faint pulse back to the transceiver; where the transceiver is further configured to receive a return pulse through the communication channel, where the state randomizer is configured to apply an inverse of the random state transformation to the return pulse; where the transceiver further includes a set of two detectors configured to measure the return pulse associated with possible paths of the return pulse through the transceiver; where reception of the faint pulse from the quantum bit encoder as the return pulse triggers a detector in the set of two detectors in one or more known time-gated timeslots determined based on the random state transformation imparted by the state randomizer; and where reception of a faked-state pulse from a third party as the return pulse results in a non-zero probability of triggering of a detector in the set of two detectors in a different time-gated timeslot.

In embodiments, the techniques described herein relate to a system, where the transceiver further includes a state converter configured to convert the faint pulse from a first state of one or more degrees of freedom of the faint pulse to a second state, where the state randomizer applies a random state transformation to the second state of the faint pulse.

In embodiments, the techniques described herein relate to a system, where the transceiver further includes a state converter including an interferometer, where the state converter is configured to convert the faint pulse from a polarization-path state to a time-polarization state with a leading time bin and a lagging time bin, where the state randomizer includes a polarization randomizer to receive the faint pulse from the state converter, where the polarization randomizer applies a random polarization transformation to the faint pulse.

In embodiments, the techniques described herein relate to a system, where the modulator includes a phase modulator configured to apply a differential phase shift between the leading time bin and the lagging time bin of the faint pulse as the one or more encoded bits.

In embodiments, the techniques described herein relate to a system, where the state converter includes a polarization converter in an arm of the interferometer to rotate light within the arm to an orthogonal polarization.

In embodiments, the techniques described herein relate to a system, where the state converter includes an additional phase modulator in one arm of the interferometer, where the additional phase modulator leaves the faint pulse from the light source to be transmitted to the quantum bit encoder unchanged, where the additional phase modulator imparts a phase shift between the leading time bin and the lagging time bin of the return pulse.

In embodiments, the techniques described herein relate to a system, where the phase shift imparted by the additional phase modulator is associated with an encoding basis, where the phase shift is one of 0 or SYMBOL on a first basis and one of 0 or π on a first basis and one of π/2 or 3π/2 on a second basis, where the encoding basis is one of the first basis or the second basis.

In embodiments, the techniques described herein relate to a system, where the transceiver determines an encoded bit of the one or more encoded bits provided by the quantum bit encoder if a measurement basis matches an encoding basis used by the phase modulator in the quantum bit encoder.

In embodiments, the techniques described herein relate to a system, where the set of two detectors are configured to measure polarization in a diagonal basis relative to the encoding basis.

In embodiments, the techniques described herein relate to a system, where the transceiver determines an encoded bit of the one or more encoded bits provided by the quantum bit encoder based on which detector in the set of two detectors is triggered along with an associated one of the known time-gated timeslots.

In embodiments, the techniques described herein relate to a system, where at least one of the transceiver or the quantum bit encoder utilize the encoded bit when generating an encryption key.

In embodiments, the techniques described herein relate to a system, where at least one of the transceiver or the quantum bit encoder utilize the encoded bit when generating the encryption key using a BB84 protocol.

In embodiments, the techniques described herein relate to a system, where the mirror is a Faraday mirror, where the Faraday mirror rotates a polarization of the faint pulse to an orthogonal state.

In embodiments, the techniques described herein relate to a system, where the polarization randomizer is a reciprocal polarization randomizer with a continuum of possible random realizations based on a Haar measure.

In embodiments, the techniques described herein relate to a system, where the polarization randomizer maintains the random polarization transformation during a round-trip time of the faint pulse between the transceiver and the quantum bit encoder.

In embodiments, the techniques described herein relate to a system, where the polarization randomizer provides the random polarization transformation for a set of time windows, where constituent windows in the set of time windows are separated by a round-trip time of faint pulse between the transceiver and the quantum bit encoder and synchronized with the transmission of the faint pulse by the transceiver.

In embodiments, the techniques described herein relate to a system, where the polarization randomizer provides additional polarization transformations for additional sets of time windows, where the constituent windows in the set of time windows are separated by the round-trip time, where the additional sets of time windows are synchronized to additional faint pulses transmitted by the transceiver.

In embodiments, the techniques described herein relate to a system, where the transceiver further includes a polarization switch between the polarization randomizer and the state converter, where the polarization switch leaves a polarization of the faint pulse to be transmitted to the quantum bit encoder unchanged, where the polarization switch applies an additional random polarization transformation to the faint pulse, where the additional random polarization transformation includes one of passing the faint pulse unmodified or rotating polarization by 90 degrees.

In embodiments, the techniques described herein relate to a system, further including a circulator to receive the faint pulse from the light source and direct the faint pulse to the state randomizer, where the circulator further receives the return pulse from the state randomizer along at least one of the possible paths and directs the return pulse to at least one of the set of two detectors.

In embodiments, the techniques described herein relate to a system, further including an optical attenuator to decrease an intensity of light provided by the light source to provide the faint pulse.

In embodiments, the techniques described herein relate to a system including a quantum key distribution (QKD) system including a transceiver including a light source configured to generate a faint pulse; a state randomizer configured to impart a random state transformation to one or more qubits associated with the faint pulse prior to transmission of the faint pulse through a communication channel; a quantum bit encoder including a modulator configured to encode an encoded bit on the faint pulse received through the communication channel; and a mirror to reflect the faint pulse back to the transceiver; where the transceiver is further configured to receive a return pulse through the communication channel, where the state randomizer is configured to apply an inverse of the random state transformation to the return pulse; where the transceiver further includes a set of two detectors configured to measure the return pulse at time-gated timeslots associated with possible paths of the return pulse through the transceiver; where reception of the faint pulse from the quantum bit encoder as the return pulse triggers a detector in the set of two detectors in one or more known time-gated timeslots determined based on the random state transformation imparted by the state randomizer; and where reception of a faked-state pulse from a third party as the return pulse results in a non-zero probability of triggering of a detector in the set of two detectors in a different time-gated timeslot; where the transceiver determines the encoded bit based on which detector in the set of two detectors is triggered along with an associated one of the known time-gated timeslots; and where the faint pulse is one of a series of faint pulses, where encoded bit is one of a series of encoded bits associated with the series of faint pulses, where at least one of the transceiver or the quantum bit encoder generate an encryption key based on the series of encoded bits; a first client to encrypt data based on the encryption key and transmit the encrypted data across an additional communication channel; and a second client to decrypt data received over the communication channel based on the encryption key.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
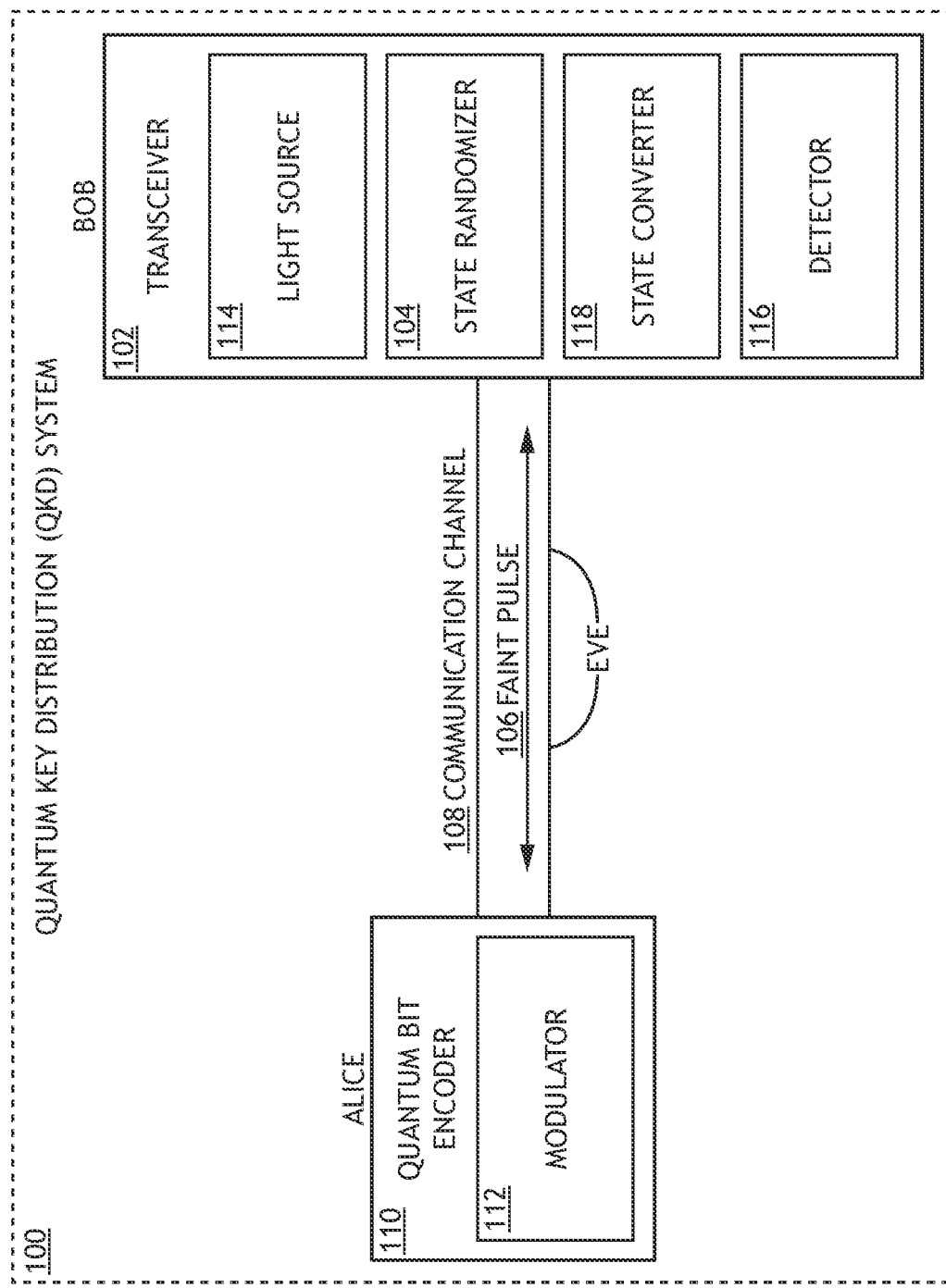
FIG. 1 is a block diagram of a QKD system for generating a key, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for quantum key distribution (QKD) communication that overcome adversarial threats such as, but not limited to, detector-control and intercept-resend attacks. For the purposes of the present disclosure, the description references two legitimate users referred to as Bob and Alice, as well as an illegitimate user (e.g., a source of a threat) referred to as Eve. It is to be understood that such references are used solely for illustrative purposes and should not be interpreted as limiting.

A QKD system may generally generate and/or distribute a key (e.g., an encryption key) for encrypting data. For example, a QKD system may utilize various principles of quantum mechanics to detect interception of transmitted bits (e.g., qubits) in a dedicated quantum communication channel by a third party (e.g., eavesdropping). In this way, a secure key may be generated and/or distributed across this quantum communication channel when no eavesdropping is detected. It is noted that various protocols or techniques have been developed to generate a secure key based on such a QKD system such as, but not limited to, the phase-coded Bennett-Brassard (BB84) protocol. Regardless of the protocol used for generation of the key, this key may then be used to encrypt communication on a separate public communication channel (e.g., a public network, or the like). Further, the QKD system may periodically update this key for improved security.

While QKD communication may theoretically provide fully secure key generation, practical implementation may introduce vulnerabilities that may be exploited by a third party (e.g., Eve) such that interception of the key (e.g., by Eve) may not be detected (e.g., by Alice and/or Bob). In particular, typical QKD systems may be vulnerable to attacks using faked-state photons such as, but not limited to, detector-control and intercept-resend attacks.

In some embodiments, a bi-directional QKD system includes a transceiver (e.g., operated by Bob) with a state randomizer to generate a faint pulse having a randomly-applied state transformation and transmit this pulse to a quantum bit encoder (e.g., operated by Alice). As used herein, the term "faint pulse" is used to refer to a pulse suitable for providing one or more quantum bits (qubits) such as, but not limited to, a single-photon pulse or a few-photon pulse.

The quantum bit encoder may then encode the communication with information (e.g., a qubit, an encoded bit, or the like) and return the faint pulse to the transceiver. The transceiver may then reverse the random state transformation with the state randomizer and decode the information encoded by the quantum bit encoder (e.g., decode the qubit). In this way, the state randomizer may be a reciprocal state randomizer. This process may be repeated any number of times with different random state transformations applied to each faint pulse and the transferred qubits may be used to generate an encryption key using any suitable protocol (e.g., QKD protocol).

In some embodiments, the transceiver further includes a state converter to convert the faint pulse from a first state (e.g., associated with one or more degrees of freedom of the light associated with the faint pulse) to second state (e.g., from a first state to a second state). In this configuration, the state randomizer may apply a random state transformation to the second state (e.g., to one or more degrees of freedom associated with the faint pulse in the second state). In this way, the randomizer may operate on a different state than used for detection of a return pulse. Both the state randomizer and the state converter may then provide reciprocal action on a return pulse to reverse their respective actions.

The state randomizer and/or the state converter may operate based on any one or more degrees of freedom including, but not limited to, polarization or time. As one non-limiting illustration, a state converter may convert a faint pulse from a polarization-path state (e.g., a two-qubit state) to a time-polarization state (e.g., a different two-qubit state). In this configuration, the state randomizer may operate as a polarization randomizer and may randomize a polarization of the faint pulse to be transmitted to the quantum bit encoder. The state randomizer may then apply an inverse polarization transformation (e.g., to reverse the random polarization transformation applied to the outgoing faint pulse) to a return pulse and the state converter may convert the return pulse to a polarization-path state for detection. For example, different detectors (e.g., single-photon detectors) may be arranged to detect each of the different possible variations of the qubits of a return pulse (e.g., a legitimate faint pulse returned by the receiver or a faked-state pulse from an intruder). Such a configuration may be made impervious to detector-control attacks such that the presence of an intruder may be detected with certainty.

It is contemplated herein that a QKD system as disclosed herein may be immune from faked-state photon attacks. For example, legitimate faint pulses returned from the quantum bit encoder (e.g., operated by Alice) may be detected with certainty since the state randomizer reverses any applied random state transformation. However, a faked-state photon (or more generally a faked-state pulse) from an intruder (e.g., Eve) will be randomized since the random state transformation is not known to the intruder. As a result, there will be a non-zero probability that the faked-state pulse will have the wrong state such that the intrusion will be detectable by Bob. It is further contemplated herein that the transceiver may be configured using commercially-available single photon detectors in such a way that it can be made impossible for an intruder to avoid triggering alert detectors regardless of the faked-state of light used.

Importantly, such a system also provides single-sided detection of intrusion by the transceiver (e.g., operated by Bob), which further prevents interception-based attacks. In particular, the random state transformation applied to each faint pulse by the transceiver is not shared in any way (e.g., is not shared with Alice operating the quantum bit encoder) such that an intruder has no opportunity to know this random state transformation. Further, since this random state transformation may be different for each pulse, attempts to determine the random state transformation for one pulse may not provide meaningful information for future pulses.

FIG. 1 is a block diagram of a QKD system 100 for generating a key (e.g., an encryption key), in accordance with one or more embodiments of the present disclosure.

In some embodiments, the QKD system 100 includes a transceiver 102 (e.g., operated by Bob) with a state randomizer 104 for generating a faint pulse 106 having a randomized state to be transmitted across a communication channel 108 as well as a quantum bit encoder 110 (e.g., operated by Alice) with a modulator 112 to encode information on the faint pulse 106. The quantum bit encoder 110 may then return the encoded faint pulse 106 to the transceiver 102 for decoding. The faint pulse 106 may be any pulse of light suitable for quantum key generation based on encoding with one or more qubits associated with one or more degrees of freedom. For example, the faint pulse 106 may include, but is not limited to, a single-photon pulse, a few-photon pulse, or a faint pulse. The communication channel 108 may include any channel suitable for light propagation including, but not limited to, a fiber-optic cable or a free-space optical channel utilizing mirrors and/or other components to propagate the faint pulse 106 through the atmosphere.

The QKD system 100 may utilize any protocol or technique known in the art for generating a key based on qubits transmitted over the communication channel 108 such as, but not limited to BB84. Further, the QKD system 100 may utilize additional communication beyond the qubits themselves for the purposes of key generation. For example, the BB84 protocol may utilize communication between the quantum bit encoder 110 and the transceiver 102 for purposes such as, but not limited to, sharing information associated with received qubits for the purposes of generating a secure key. Such communication may in some cases be public and may generally occur over any suitable communication channel including, but not limited to, the communication channel 108 used for transmission of the qubits or a public communication channel. In this way, the key may be generated based on shared communication between the quantum bit encoder 110 and the transceiver 102 rather than one-way transmission of a generated key. It is thus to be understood that the terms quantum bit encoder 110 and transceiver 102 are used solely for illustrative purposes and should not be interpreted as limiting the functions of any components of the QKD system 100.

Operation of the QKD system 100 is now described in greater detail, in accordance with one or more embodiments of the present disclosure.

In some embodiments, the transceiver 102 includes a light source 114 configured to generate the faint pulse 106. The light source 114 may include any type of light source known in the art suitable for generating light that may be used for quantum key generation. In some embodiments, the light source 114 includes a laser source. Further, the light source 114 may directly generate the faint pulse 106 or may include an optical attenuator to decrease an intensity of a generated pulse to operate as a faint pulse 106 (e.g., as a single-photon pulse, or the like).

In some embodiments, the state randomizer 104 of the transceiver 102 applies an inverse state transformation to the return pulse and detects the return pulse using any of one or more detectors 116. For example, the transceiver 102 may include multiple detectors 116 (or sets of detectors 116) arranged along different paths, where the path taken by any particular return pulse may depend at least in part on its state after passing through the state randomizer 104.

This return pulse may either be the encoded faint pulse 106 from the quantum bit encoder 110 (e.g., a legitimate pulse from Alice) or a faked-state pulse from an interceptor (e.g., an illegitimate pulse from Eve). When the return pulse is a legitimate pulse, the state randomizer 104 reverses the applied random state transformation with certainty and may then detect this legitimate pulse with certainty along a known path or a known set of possible paths based on knowledge of the characteristics of the outgoing faint pulse 106 and the applied/reversed state transformation. When the return pulse is an illegitimate pulse, the inverse state transformation applied by the state randomizer 104 will result in this illegitimate pulse having a randomized state such that the return pulse will travel down a randomized path. Since the possible path or paths of a legitimate pulse is known with certainty and the path taken by an illegitimate return pulse is randomized, detection along any path other than an expected possible path of the legitimate pulse indicates that the return pulse is an illegitimate faked-state pulse from an intruder.

The state randomizer 104 may randomize any degree of freedom (e.g., any state, any qubit, or the like) associated with a faint pulse 106 such as, but not limited to, a polarization, a phase, or a time-bin qubit. The transceiver 102 may additionally include a state converter 118 to convert the faint pulse 106 between different states. In this way, the faint pulse 106 may have any selected configuration when transmitted over the communication channel 108.

In some embodiments, the transceiver 102 provides a faint pulse 106 having a time-polarization state with one qubit associated with time (or time bins) and one qubit associated with polarization. For example, the faint pulse 106 may include a photon wavepacket distributed in two time bins associated with the time qubit. Further, the polarization of the faint pulse 106 may correspond to a polarization qubit. In this configuration, the state randomizer 104 may operate as a polarization randomizer and apply a random polarization transformation to the polarization qubit of the faint pulse 106. It is contemplated herein that such a configuration may be well suited for, but not limited to, robust communication over the communication channel 108.

In this configuration, the transceiver 102 may include a state converter 118 formed as an interferometer to provide the time-bin encoding and, more particularly, to provide a transformation of the faint pulse 106 between a polarization-path state and a time-polarization state. In this way, the faint pulse 106 may be transmitted across the communication channel 108 with a time-polarization state and the return pulse may be detected in a polarization-path state. For example, the transceiver 102 may include one or more polarizing beam splitters to provide different paths for the different configurations of the time and polarization qubits of the return pulse for separation detection by different detectors 116.

Referring now to FIGS. 1-8, various non-limiting configurations of a QKD system 100 are described, in accordance with one or more embodiments of the present disclosure. In particular, FIGS. 1-8 depict transmission of a faint pulse 106 with a time-polarization state and detection of a return pulse in a polarization-path state, where the state randomizer 104 in the transceiver 102 operates as a polarization randomizer. However, it is to be understood that these particular configurations of the QKD system 100 are provided merely for illustrative purposes and should not be interpreted as limiting. Rather, the state randomizer 104 may generally operate on any degree of freedom of the faint pulse 106 and the faint pulse 106 be transmitted and detected in any states.

Figure 2A:
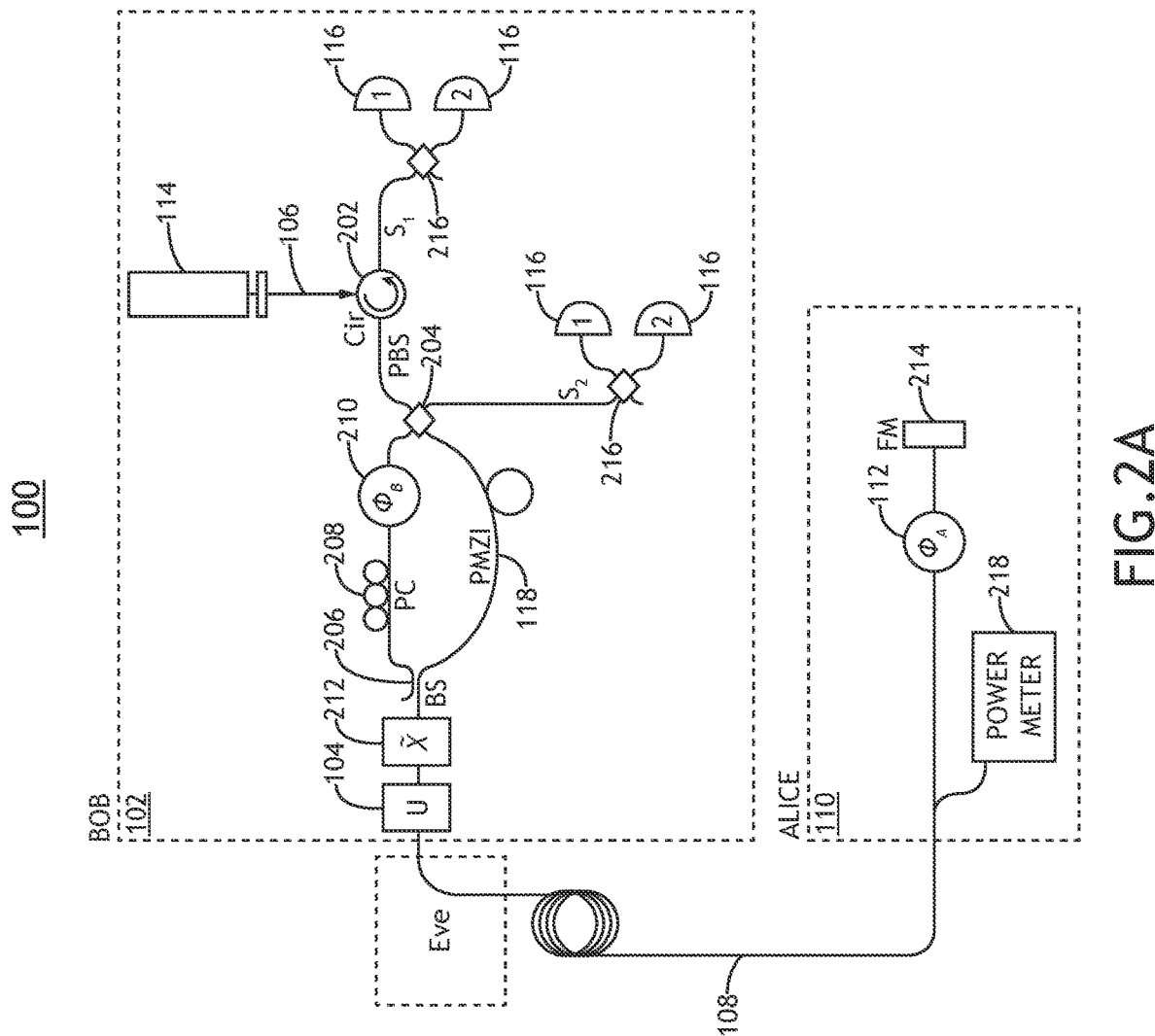
FIG. 2A is a simplified schematic of a first configuration of a QKD system, in accordance with one or more embodiments of the present disclosure.

FIG. 2A is a simplified schematic of a first configuration of a QKD system 100, in accordance with one or more embodiments of the present disclosure.

In some embodiments, a faint pulse 106 generated by the light source 114 propagates to a state randomizer 104 through a circulator 202 and a state converter 118 including an interferometer. In this way, the interferometer may convert the faint pulse 106 into a time-bin state (e.g., as a time-bin qubit) in which information may potentially be encoded in time bins. The interferometer may include any type of interferometer suitable for providing multiple time bins. For example, FIG. 2A depicts the state converter 118 as a polarizing Mach-Zehnder interferometer (PMZI) including a polarizing beam splitter (PBS) 204 followed by the interferometer's short and long arms with propagation times $t_1$ and $t_2$, respectively, and then a beam splitter (BS) 206.

In some embodiments, the interferometer further includes a polarization rotator 208 in one arm to convert the polarization of light in that arm to an orthogonal polarization (e.g., from horizontal (H) to vertical (V) or vice versa). For example, FIG. 2A depicts a polarization rotator 208 in the short arm of the interferometer. The polarization rotator 208 may include any component suitable for providing reciprocal (e.g., bi-directional) polarization rotation such as, but not limited to, a half-wave plate (HWP) in the free-space implementation or a polarization controller (PC) in an optical-fiber implementation.

In some embodiments, the transceiver 102 includes one or more components that may be idle during transmission of the faint pulse 106 (e.g., have no impact on a transmitted faint pulse 106, but may be active when receiving a return pulse). Such components may thus facilitate detection of a legitimate return pulse from the quantum bit encoder 110 and/or an illegitimate return pulse from an intruder (e.g., Eve). For example, FIG. 2A illustrates a phase modulator 210 in one arm of the interferometer. As another example, FIG. 2A illustrates a polarization switch 212 between the state randomizer 104 and the state converter 118, which may be idle during transmission of the faint pulse 106.

It is contemplated herein that this novel arrangement of the state converter 118 as a PMZI manipulates the outgoing two-qubit state by converting the polarization qubit of a generated faint pulse 106 into a time-bin qubit and the path qubit into a polarization qubit. In particular, the faint pulse 106 generated by the light source 114 may propagate along an initial path (e.g., path $s_1$) with a polarization characterized by:

$$\frac{1}{\sqrt{2}}(|H\rangle + |V\rangle)|s_1\rangle,$$

where H and V correspond to horizontal and vertical polarization, respectively. In this configuration, the faint pulse 106 may be in a polarization-path state. The state converter 118 may then convert the faint pulse 106 to a time-polarization state characterized by $$\frac{1}{\sqrt{2}}(|t_1\rangle + |t_2\rangle)|H\rangle.$$

The state randomizer 104 operating as a polarization randomizer may then apply a random transformation U, known only at the transceiver 102 (e.g., known only to Bob), on the polarization qubit of the faint pulse 106. The produced state $$\frac{1}{\sqrt{2}}(|t_1\rangle + |t_2\rangle)U|H\rangle$$

is then sent over the communication channel 108 to the quantum bit encoder 110.

Therefore, for each faint pulse 106, the emerging polarization state U|H⟩ of each faint pulse 106 is independently randomized to be any state in the continuous 2D domain over the Poincaré sphere, or altered among a sufficiently large number of independent discrete settings. In some embodiments, the state randomizer 104 provides a continuum of random realizations of polarization based on a Haar measure.

In some embodiments, the modulator 112 in the quantum bit encoder 110 is a phase modulator that applies a differential phase shift $\phi_A$ between the leading time bin |$t_1$⟩ of the faint pulse 106 and the lagging time bin |$t_2$⟩. The modulator 112 may generally apply any phase shift suitable for decoding by the transceiver 102 and further suitable for any selected QKD generation protocol. For example, the modulator 112 may apply a phase shift $\phi_A$ of 0 or $\pi$ (encoding the time-bin qubit in X basis), and $\pi/2$ or $3\pi/2$ (encoding in Y basis) in accordance with the BB84 protocol (which may randomly switch between the two bases).

In some embodiments, the quantum bit encoder 110 includes one or more components to return the encoded faint pulse 106 to the transceiver 102 along the communication channel 108. For example, as depicted in FIG. 2A, the quantum bit encoder 110 may include a Faraday mirror (FM) 214 to reflect the encoded faint pulse 106 back to the transceiver 102. Reflection from a Faraday mirror may turn the polarization of the faint pulse 106 into an orthogonal state, which may compensate for any distortion in the polarization state due to the communication channel 108 and the random transformation U applied by the state randomizer 104.

The transceiver 102 may then receive a return pulse over the communication channel 108, which may generally include the encoded faint pulse 106 from the quantum bit encoder 110 (e.g., a legitimate pulse) or a faked-state pulse from an intruder (e.g., an illegitimate pulse).

In some embodiments, the state randomizer 104 applies an inverse state transformation intended to reverse the random transformation U. In this way, the state randomizer 104 may operate as a reciprocal state randomizer. In the case that the return pulse is a legitimate pulse, the state of the return pulse after the state randomizer 104 is $$\frac{1}{\sqrt{2}}(e^{i\phi_A}|t_1\rangle + |t_2\rangle)|V\rangle.$$

In the case that the return pulse is an illegitimate pulse, the state of the return pulse after the state randomizer 104 is randomized.

It is contemplated herein that the state randomizer 104 and the transceiver 102 more generally may operate with different timing configurations to provide the random transformation U on an outgoing faint pulse 106 and an inverse transformation to an associated return pulse.

In some embodiments, the state randomizer 104 maintains a constant state during a round-trip time associated with the faint pulse 106 through the communication channel 108. For example, the state randomizer 104 may maintain the transformation U unchanged during the roundtrip time and thus provide the inverse transformation to the return pulse.

In some embodiments, the state randomizer 104 provides the random transformation U (and thus the reciprocal inverse transform for the return pulse) for a set of time windows separated by the round-trip time of the faint pulse 106 through the communication channel 108. In this configuration, the faint pulse 106 may be transmitted during a first time window having a width (e.g., a transmission window) of a set and received in a second time window of the set (e.g., a listening window). Further, the transceiver 102 may not transmit any faint pulses 106 during the listening window. During the intervening times, the state randomizer 104 may have any value. In some embodiments, the state randomizer 104 provides a sequence of time windows, each set having transmission and listening windows separated by the round-trip time, and each set providing a different random transformation U to a different faint pulse 106 (and associated reciprocal inverse transform for the return pulse). For example, the sequence of random transformations U used during the transmission windows and/or the associated configuration settings may be stored in a local memory of the transceiver 102 and reapplied for the corresponding listening windows. It is contemplated herein that this technique may be suitable for, but is not limited to, providing a data transfer rate between the transceiver 102 and the quantum bit encoder 110 faster than allowed by the round-trip time. For example, maintaining the state of the state randomizer 104 during the entire round-trip time may limit the data transfer rate (e.g., the rate at which faint pulses 106 may be transmitted by the transceiver 102) to this round-trip time. However, transmitting a sequence of faint pulses 106 in a set of time windows having widths smaller than the round trip time may enable the transmission of multiple faint pulses 106 within the round-trip time of a single faint pulse 106. Further, since each set of time windows is separated by the round-trip time, the operation of the transceiver 102 is the same as the configuration in which the state of the state randomizer 104.

The transceiver 102 may know the round-trip time using any suitable technique. In some embodiments, the transceiver 102 transmits one or more preliminary pulses of light through the communication channel 108 and measures the round-trip time of these preliminary pulses prior to transmitting any of the faint pulses 106.

The detection of the return pulse is now described in greater detail, in accordance with one or more embodiments of the present disclosure.

In some embodiments, the state converter 118 converts the return pulse from the time-polarization state to a polarization-path state. For example, FIG. 2A illustrates two possible paths $s_1$ and $s_2$ that the return pulse may take upon exiting the PBS 204 of the interferometer.

In some embodiments, the transceiver 102 includes a set of detectors 116 arranged along different possible paths. For example, the transceiver 102 may include one or more detectors 116 (e.g., detector subsets) along each exit path from the interferometer.

In some embodiments, the transceiver 102 further includes a polarization switch 212 to randomly apply a second polarization transformation to the return pulse, which may influence the path of the return pulse. This polarization switch 212 may be implemented as a separate component or may be implemented within the state randomizer 104. In some embodiments, the polarization switch 212 either remains idle (e.g., applies the identity operator I) or applies a transformation that flips $|H\rangle$ to $|V\rangle$ and vice versa such as, but not limited to, the Pauli X operator (e.g., a quantum NOT operator) or the Pauli Y operator. As with the random transformation U, the operation of the polarization switch 212 may be known only by the transceiver 102 and is not shared (e.g., is not shared with Alice). Using the quantum NOT operator as a non-limiting example throughout for illustrative purposes, the resulting state of the return pulse may be characterized as $$\frac{1}{\sqrt{2}}(e^{i\phi_A}|t_1\rangle + |t_2\rangle \tilde{X}|V\rangle).$$

where $\tilde{X}$ represents the random operation of the polarization switch 212. The detectors 116 may then be gated to allow only for the detection of the interfering possibilities: short-long and long-short in the forward-backward propagations through the arms of the interferometer.

In some embodiments, the phase modulator 210 in the interferometer applies a phase delay $\phi_B$ between the leading and lagging time bins of the return pulse. For example, in the configuration depicted in FIG. 2A, the phase modulator 210 applies on the lagging time-bin of the incoming photon a phase $\phi_B$ of 0 or $\pi$ (encoding in X basis), and $\pi/2$ or $3\pi/2$ (encoding in Y basis). Therefore, if $\tilde{X}=X$ (or any transformation that flips $|H\rangle$ to $|V\rangle$ and vice versa), the state is $$\frac{1}{\sqrt{2}}(|H\rangle + e^{i(\phi_A - \phi_B)}|V\rangle)|s_1\rangle$$

with the return pulse propagating along path $s_1$. But for $\tilde{X}=I$, it yields the state $$\frac{1}{\sqrt{2}}(|H\rangle + e^{i(\phi_A - \phi_B)}|V\rangle)|s_2\rangle$$

with the return pulse propagating along path $s_2$. In either case, the path of a legitimate return pulse is known. As a result, a legitimate return pulse will result in a tick on one or more detectors 116 (e.g., a first detector subset) along a known possible path (e.g., an exit path of the interferometer). Alternatively, reception of an illegitimate faked-state pulse as the return pulse will result in a non-zero probability of triggering an additional one or more detectors 116 (e.g., a second detector subset) associated with alternative paths through the transceiver 102 (e.g., associated with an additional exit path of the interferometer).

The polarization of the return pulse in either arm may then be measured. In some embodiments, as depicted in FIG. 2A, the transceiver 102 may include additional polarizing beam splitters 216 in each path ($s_1$ and $s_2$) and corresponding detectors 116 on the outputs. Further, this polarization measurement may be performed in a diagonal basis regardless of the path. As is common in BB84 protocol, the transceiver 102 (e.g., Bob) can determine the encoded bit (e.g., from Alice) from the return pulse if the encoding bases of the transceiver 102 and the quantum bit encoder 110 match.

Referring now generally to FIG. 2A, the path of a legitimate pulse from the quantum bit encoder 110 through the transceiver 102 may be known based on the choice of the transformation applied by the polarization switch 212. As will be shown below, the detection of any photons in a different path is an indication of intrusion, and hence triggers an alert event. It is contemplated that the systems and methods disclosed herein utilizing a state randomizer 104 (e.g., a randomized gateway) critically guarantees unconditional security against intercept-resend and detector-control attacks. This guaranteed unconditional security does not involve any constraints on the system and is therefore implementable using commercially available components. The time synchronization between the transceiver 102 and the quantum bit encoder 110 (e.g., between Bob and Alice) may be performed using any suitable technique including, but not limited to, on a wavelength-multiplexed channel over the same communication channel 108 or a different channel.

Additionally, in some embodiments, the quantum bit encoder 110 includes a power meter 218 to monitor the power input to the quantum bit encoder 110, which may reveal Trojan horse attacks.

The detection of an intruder (e.g., Eve) is now described in greater detail, in accordance with one or more embodiments of the present disclosure.

It may be assumed that the Eve is acquainted with the configuration of the QKD system 100 including all classical information, except for the applied random transformations U and $\tilde{X}$. To avoid detection, she may attempt to always signal the detectors 116 in the correct path (e.g., associated with a known path of a legitimate return pulse as described previously herein) without triggering a click on the detectors 116 in the other paths. For a typical intercept-resend attack, Eve intercepts the encoded faint pulse 106 from the quantum bit encoder 110 (e.g., from Alice) and then measures both the key (time-bin) qubit and the ancillary (polarization) qubit. She (e.g., Eve) may then send to the transceiver 102 (e.g., to Bob) a faked-state pulse of a time-bin state $$\frac{1}{\sqrt{2}}(e^{i\phi_E}|t_1\rangle + |t_2\rangle),$$

to mimic the measured key qubit, along with a polarization state $\rho_p$. It may be shown mathematically that after passing the state randomizer 104 and the state converter 118 (e.g., the PMZI in FIG. 2A) within the gated window at $t_1+t_2$, the faked-state pulse from Eve has the probabilities $p_1 = \langle H|\tilde{X}U\rho_p U^+\tilde{X}|H\rangle$ and $p_2 = \langle V|\tilde{X}U\rho_p U^+\tilde{X}|V\rangle$ to end up in the paths $s_1$ and $s_2$, respectively (see, e.g., Hegazy, S. F. et al., J. Lightwave Tech. 40, no. 21, pp. 6995 (2022), which is incorporated herein by reference in its entirety).

Therefore, if $\rho_p$ is chosen regardless of the operation $\tilde{X}U$, it may be determined that the return pulse will route to the wrong path with a mean probability ≥25% (the probability 25% occurs if $\rho_p$ is pure). Thus, if, after measuring the faint pulse 106, Eve sends a faked-state pulse and the detectors 116 in the transceiver 102 are in Geiger mode, this gives a probability ≥25% that an alert is triggered. If Eve's strategy were based on sending solitary bright pulses aiming to tick one detector 116 or to blind all but one detector 116, it is straightforward to deduce the alert probability based on the single-photon case. Attacks based on solitary bright pulses are described generally in Wiechers, C. et al., New. J. Phys 13, 013043 (2011); Lydersen, L. et al., Phys. Rev. A 84, 032320 (2011); Bugge, A. N. et al., Phys. Rev. Lett. 112, 070503 (2014); and Qian, Y. J., et al., Optica 6, 1178-1184 (2019); all of which are incorporated herein by reference in their entireties.

Aiming to control the detectors 116 in the transceiver 102, Eve may use triggering multiphoton pulse together with a blinding light. Under blinding, a single-photon detector 116 in the linear mode never ticks if the triggering-pulse energy is below a threshold $E_{never}$. This threshold is a monotonic increasing function of the level of blinding light power $I_{Bl}$, therefore $\min\{E_{never}(I_{Bl})\} = E_{never}(\min\{I_{Bl}\})$ (see, e.g., Huang, A., et al., IEEE J. Quantum Elect. 52, 8000211 (2016), which is incorporated herein by reference in its entirety). For unnoticeable detector control, there are two necessary requirements associated with the choice about $\tilde{X}$ (e.g., the operation of the polarization switch 212 known only by the transceiver 102). Requirement (1): To avoid triggering an alert: if, due to the randomization $\tilde{X}U$, the maximum trigger-pulse energy ends up at a detector 116 in a wrong path, this shouldn't trigger a click. Requirement (2): to be able sometimes to click the detectors 116 in the correct path. For a varying blinding power, the two requirements should be satisfied at the minimum $E_{never}(I_{Bl})$, which corresponds to the minimum blinding power $\min\{I_{Bl}\}$.

For any two detectors 116: i in path $s_1$ and j in path $s_2$, the two requirements can be expressed for the first embodiment as $$\text{If } \tilde{X} = I: (1)\hat{E}_{tr}^{s_1} < E_{never}^{s_1(i)}(\min\{I_{Bl}\}), \quad (2)\hat{E}_{tr}^{s_2} > E_{never}^{s_2(j)}(\min\{I_{Bl}\})$$

$$\text{If } \tilde{X} = X: (1)\hat{E}_{tr}^{s_2} < E_{never}^{s_2(j)}(\min\{I_{Bl}\}), \quad (2)\hat{E}_{tr}^{s_1} > E_{never}^{s_1(i)}(\min\{I_{Bl}\})$$

where $\hat{E}_{tr}^{s_1}$ and $\hat{E}_{tr}^{s_2}$ are the maximum trigger pulse energy ending up on a detector 116 in paths $s_1$ and $s_2$, respectively. The two requirements thus contradict for the two random choices of $\tilde{X}$, which renders Eve's unnoticeable detector-attack impossible. Also, by the symmetry of the paths $s_1$ and $s_2$ in FIG. 2A to the random action $\tilde{X}U$, the maximum energy that may reach a detector placed in any of the two paths is equal. Therefore, the operation of the QKD system 100 is constrained to the characteristic line: $\hat{E}_{tr}^{s_1} = \hat{E}_{tr}^{s_2}$ since Eve has no knowledge about the current setting of U.

Figure 2B:
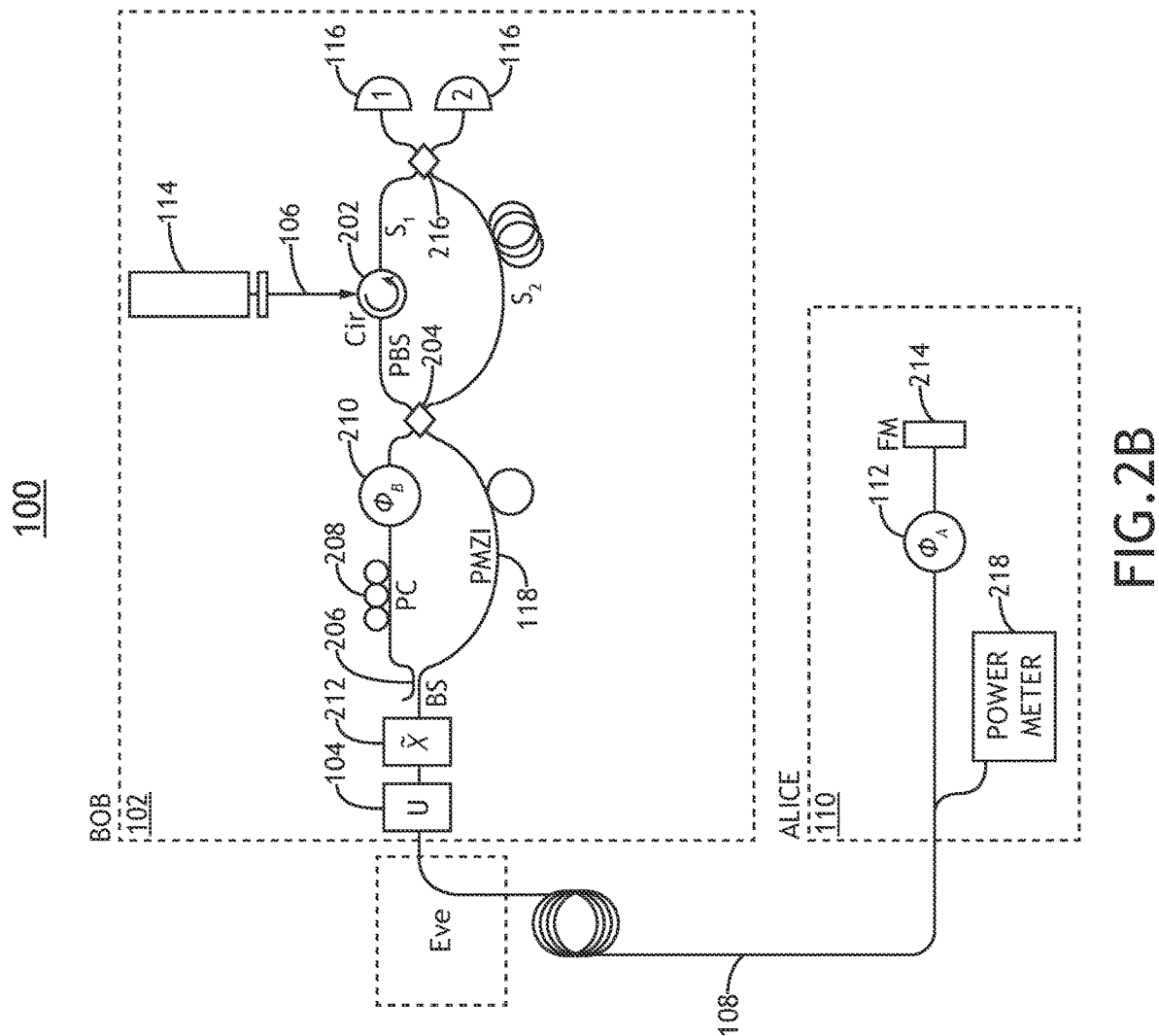
FIG. 2B is a simplified schematic of a second configuration of the QKD system 100, in accordance with one or more embodiments of the present disclosure.

FIG. 2B is a simplified schematic of a second configuration of the QKD system 100, in accordance with one or more embodiments of the present disclosure. This configuration is identical to the configuration depicted in FIG. 2A, but it excludes the use of two separate subsets of detectors 116 in paths $s_1$ and $s_2$. In this configuration, the paths $s_1$ and $s_2$ feed two input ports of PBS 216 to share access to a single set of two detectors 116. The lengths of the two paths $s_1$ and $s_2$ are selected to be different enough that their differential propagation time is much greater than the time-bin difference $t_1-t_2$. Optical signals that pass-through paths $s_1$ and $s_2$ are therefore marked in time, which renders them distinguishable based on the instants of their detection. The two heavily unbalanced paths $s_1$ and $s_2$ then serve as a marker that transfers the which-path information into the time degree of freedom.

In this configuration, the transceiver 102 (e.g., operated by Bob) measures each return pulse at two time-gated time slots associated with the propagation times along the paths $s_1$ and $s_2$ of the marker, added to the time of the interfering possibilities: short-long and long-short in the forward-backward propagations through the arms of the interferometer. The detection in one of these two timeslots corresponds to one of the paths $s_1$ and $s_2$. The transceiver 102 compares the detection timeslot with what it should be based on the current operation of the polarization switch 212. This determines whether an alert event should be identified. Put another way, reception of the faint pulse 106 from the quantum bit encoder 110 as the return pulse triggers one of the detectors 116 in one or more known time-gated timeslots determined based on the random state transformation imparted by the state randomizer, whereas reception of a faked-state pulse from a third party (e.g., Eve) as the return pulse results in a non-zero probability of triggering of a detector 116 in a different time-gated timeslot.

As in the first configuration depicted in FIG. 2A, the transceiver 102 can determine the encoded bit (e.g., from Alice) from the return pulse if the bases of the transceiver 102 and the quantum bit encoder 110 match, as is common in the BB84 protocol. However, in this configuration, the randomized operation of the polarization switch does not only direct the return pulse to path $s_1$ or path $s_2$, but it also reorders the detectors assigned to a decoded '0' and '1' bits. This protects against several attacks (e.g., time-shift attack) that rely on Eve's knowledge about the identity of detectors assigned to a decoded '0' or '1' bit.

More generally, the transceiver 102 (e.g., operated by Bob) applies randomized operations that are not shared by any other party (including Alice). Some of these randomized operations may be active on a transmitted faint pulse 106, or when receiving a return pulse, or on both. This may be random rotation of the basis space of the transceiver and/or reordering of the detectors 116 assigned to received '0' and '1' bits. However, these randomized operations always lead to deterministic outcomes for a legitimate return pulse. Suitable measurement by the transceiver 102 may thus discriminate a legitimate return pulse from an illegitimate return pulse. The received rate of illegitimate return pulses, as identified by the alert rate, gives a more trusted measure of the detectivity of intrusion, compared to the commonly used quantum bit error rate.

Figure 3:
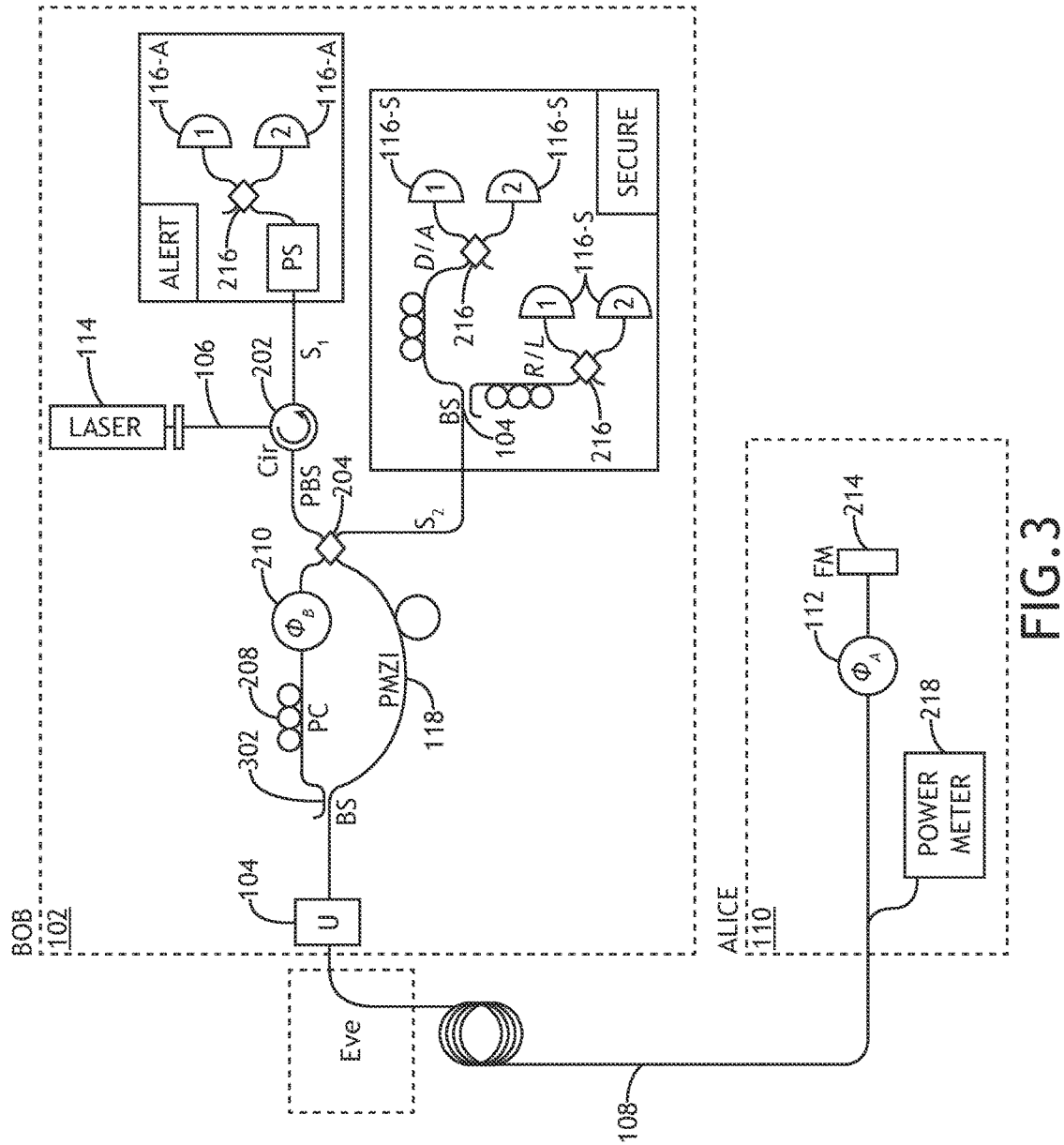
FIG. 3 is a simplified schematic of a third configuration of the QKD system, in accordance with one or more embodiments of the present disclosure.

FIG. 3 is a simplified schematic of a third configuration of the QKD system 100, in accordance with one or more embodiments of the present disclosure. This configuration is identical to the configuration depicted in FIG. 2A, but excludes the use of the polarization switch 212. Therefore, a legitimate return pulse always back-traces the system through path $s_2$ (e.g., a first exit path from the interferometer), which may be referred to as a secure path for this configuration. Further, the state of a legitimate return pulse (e.g., an encoded faint pulse 106 from the quantum bit encoder 110) after the state converter 118 may be characterized as $$\frac{1}{\sqrt{2}}(|H\rangle + e^{i\phi_A}|V\rangle)|s_2\rangle.$$

Due to the randomization U, the polarization state of a faked-state pulse from Eve is randomized and hence directed in a random basis to a detector in path $s_1$ (e.g., a second exit path from the interferometer) with a non-zero probability, whereupon it triggers an alert event. Path $s_1$ may therefore be referred to as an alert path in this configuration.

If a faked-state pulse from Eve has the polarization state $\rho_p$, there will be probabilities: $p_1 = \langle H|U\rho_p U^+|H\rangle$ and $p_2 = \langle V|U\rho_p U^+|V\rangle$ to end up in the alert ($s_1$) and secure ($s_2$) paths, respectively. This would give an alert probability identical to the configuration shown in FIG. 2A if Eve used single photons and solitary bright pulses. If Eve uses triggering multiphoton pulse together with a blinding light, the arrangement of the transceiver 102 dictates that a detector 116-A (e.g., a detector in a first detector subset) in the alert-path will be double blinded on average relative to a detector 116-S in the secure path (e.g., a detector in a second detector sub-set).

The two necessary requirements of unnoticeable detector control are therefore expressed as follows: (1) $\hat{E}_{tr}^{s_1} < E_{never}^{s_1(i)}(\min\{I_{Bl}\})$, (2) $\hat{E}_{tr}^{s_2} > E_{never}^{s_2(j)}(\min\{I_{Bl}\}/2)$. These two requirements define a camouflage region for unnoticeable Eve's detector control. Also, by the symmetry of the paths $s_1$ and $s_2$ in FIG. 3 to the randomized action U, the maximum trigger pulse energy that may reach a detector 116-A placed in the alert path $s_1$ is always double that of a detector 116-S in the secure path $s_2$. This doubling of the maximum possible pulse energies reaching alert detectors relative to the secure detectors is due to the beam splitter (BS) 302 in the secure path $s_2$. Therefore, the operation of the QKD system 100 in this configuration is constrained to the characteristic line: $\hat{E}_{tr}^{s_1} = 2\hat{E}_{tr}^{s_2}$ as long as Eve has no knowledge about the current setting of U.

In this configuration depicted in FIG. 3, the necessary requirements (1) and (2) of unnoticeable Eve's detector control can be then made impossible by assigning alert detectors 116-A higher sensitivity compared to the secure detectors 116-S. The higher sensitivity in the linear mode is determined by the lower profile of the threshold $E_{never}$ as a function of the blinding power of the associated detector 116. The doubling of pulse energy introduced by the BS 302 in path $s_2$ is optional in this configuration. The doubling serves to render requirements (1) and (2) certainly impossible, by virtue of the compressive behavior of the threshold $E_{never}$ as function of the blinding power of a detector generally (see, e.g., Huang, A., et al., IEEE J. Quantum Elect. 52, 8000211 (2016), which is incorporated herein by reference in its entirety). However, if the alert detectors 116-A have sufficiently higher sensitivity relative to the secure detectors 116-S, the measurements in paths $s_1$ and $s_2$ can be then performed just like the configuration shown in FIG. 2A, along with phase $\phi_B$ encoding in the interferometer of the state converter 118.

For both configurations, after the quantum transfer session completes, the transceiver 102 (e.g., Bob) may check the count of the alert events. If they are within the range of error tolerance, a key may be generated following a selected protocol (e.g., BB84). Otherwise, the session may be aborted.

Referring now to FIGS. 4-7, experimental and theoretical demonstrations of various non-limiting configurations of the QKD system 100 are described in greater detail, in accordance with one or more embodiments of the present disclosure.

Figure 4:
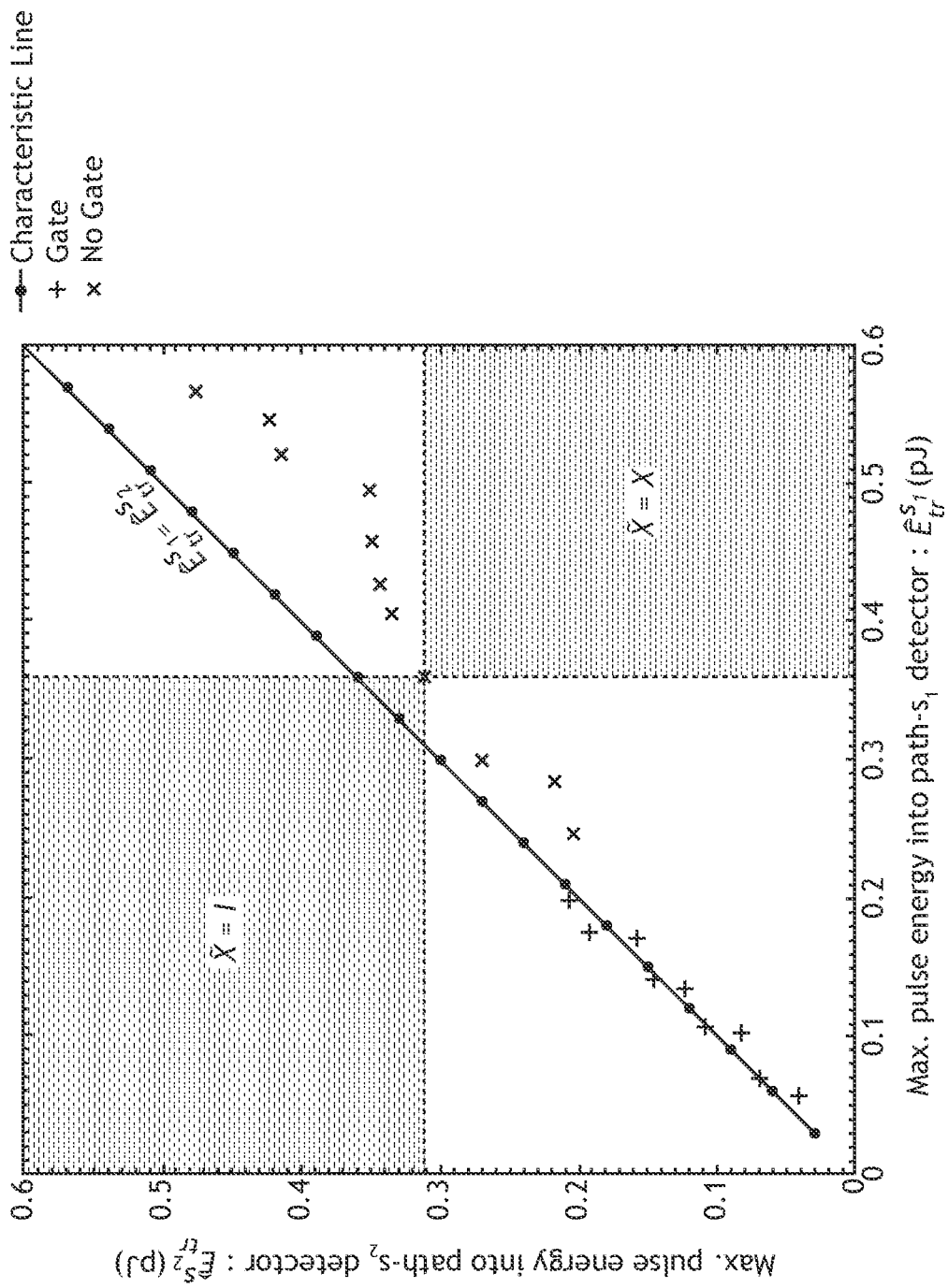
FIG. 4 is a plot depicting maximum pulse energies in different paths of the transceiver as configured in FIG. 2A, in accordance with one or more embodiments of the present disclosure.

FIG. 4 is a plot depicting maximum pulse energies in different paths of the transceiver 102 as configured in FIG. 2A, in accordance with one or more embodiments of the present disclosure. FIG. 4 demonstrates the impossibility of a successful detector-control attack. Not knowing about the current settings of the operation $\tilde{X}U$, Eve cannot shift the operation of the QKD system 100 away from the characteristic line: $\hat{E}_{tr}^{s_1} = \hat{E}_{tr}^{s_2}$ or change the equality of the minimum blinding power level at each detector 116.

As a non-limiting demonstration, FIG. 4 includes experimental results using the two detectors of the commercial QKD system "Clavis2" (by ID Quantique) in place of the detectors 116 in paths $s_1$ and $s_2$ in the configuration shown in FIG. 2A. The symbols+ and x denote the intersection points of the crossing thresholds: $E_{never}^{s_1(1)}$ (vertical line) and $E_{never}^{s_2(1)}$ (horizontal line) measured for the two detectors 116. Measurements are performed within (denoted by +) and without (denoted by x) the detector gate at the same blinding power level for each point. The values of blinding power at each detector were measured for this example at $I_{Bl}=\{0.09, 0.107, 0.136, 0.196, 0.256, 0.318, 0.377, 0.445, 0.505, 0.564, 0.625\}$ milliWatts (mW) (ordered from the leftmost point in FIG. 4 to the rightmost one for both gated and non-gated detection). For example, see Huang, A., et al., IEEE J. Quantum Elect. 52, 8000211 (2016), which is incorporated herein by reference in its entirety. However, it is to be understood that the system is not limited to the detectors in "Clavis2" and that the results are presented solely for illustrative purposes.

The two requirements for each choice of $\hat{X}$ define a region in FIG. 4 bordered in two sides by the thresholds $E_{never}^{s1(1)}$ and $E_{never}^{s2(1)}$. The two regions corresponding to the two choices of $\hat{X}$ neither overlap nor intersect. The impossibility of an unnoticeable attack has been demonstrated by the inability of common intersection among the characteristic line $\hat{E}_{tr}^{s1} = \hat{E}_{tr}^{s2}$ and both regions given for the two choices of $\hat{X}$ at the same blinding power.

Figure 5:
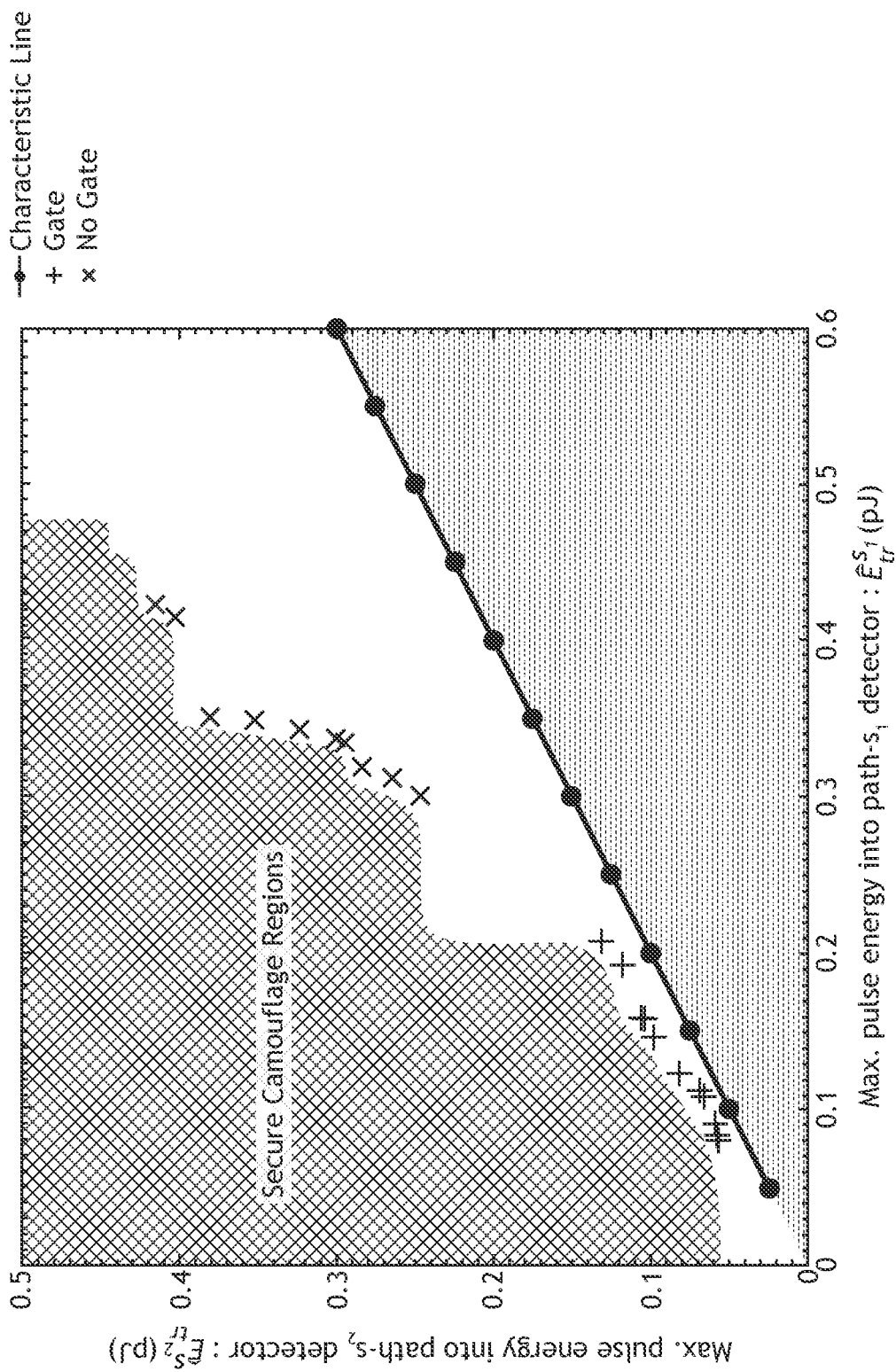
FIG. 5 is a plot depicting maximum pulse energies in different paths of the transceiver as configured in FIG. 3, in accordance with one or more embodiments of the present disclosure.

FIG. 5 is a plot depicting maximum pulse energies in different paths of the transceiver 102 as configured in FIG. 3, in accordance with one or more embodiments of the present disclosure. Again, the two detectors of the commercial QKD system "Clavis2" are used for the detectors 116 of the configuration in FIG. 3 as a non-limiting example, where the plot in FIG. 5 represents detectors 116-A in the alert path and detectors 116-S in the secure path. The more sensitive detector in the linear mode is assigned to the alert path. This higher sensitivity is verified by the relatively lower profile of $E_{never}(I)$ for the alert detector 116-A compared to the secure detector 116-S.

As shown in FIG. 5, the characteristic line: $\hat{E}_{tr}^{s1} = 2\hat{E}_{tr}^{s2}$ dictates that, over the random settings of U, the maximum trigger pulse energy that may strike an alert detector 116-A is double that for a secure detector 116-S. The operation of the transceiver 102 (e.g., Bob) is restricted to this characteristic line as long as Eve does not know about U. The markers are intersection points of $E_{never}$ thresholds for the alert detector 116-A (vertical threshold) and secure detector 116-S (horizontal threshold). The combined threshold points (denoted by + and x) mark the intersections of experimentally measured thresholds for two detectors of the commercial QKD system Clavis2 (ID Quantique) in the presence (denoted by +) and the absence (denoted by x) of the detector gate. Bordered by the crossing $E_{never}$ thresholds of the alert and secure detectors, the camouflage regions (grey areas) define Eve's unnoticeable operation space.

The impossibility of launching an unnoticeable detector-control attack is verified here by the non-overlap of any camouflage region with the characteristic line $\hat{E}_{tr}^{s1} = \hat{E}_{tr}^{s2}$. This security is guaranteed with the appropriate selection of commercial single-photon detectors (SPDs) in the transceiver 102.

Figure 6:
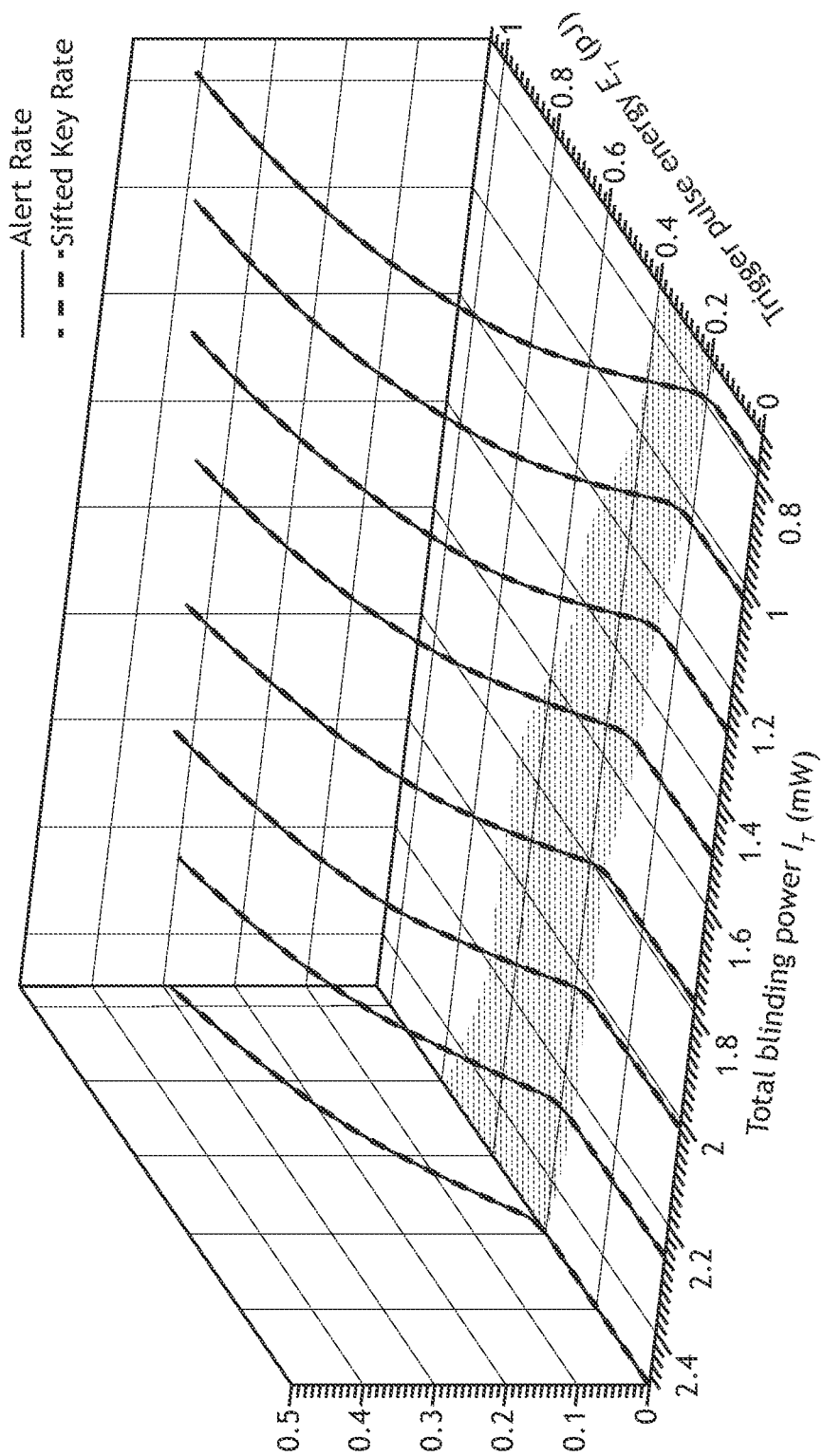
FIG. 6 is a plot of alert and sifted key rates for the configuration of the QKD system in FIG. 2A, in accordance with one or more embodiments of the present disclosure.
Figure 7:
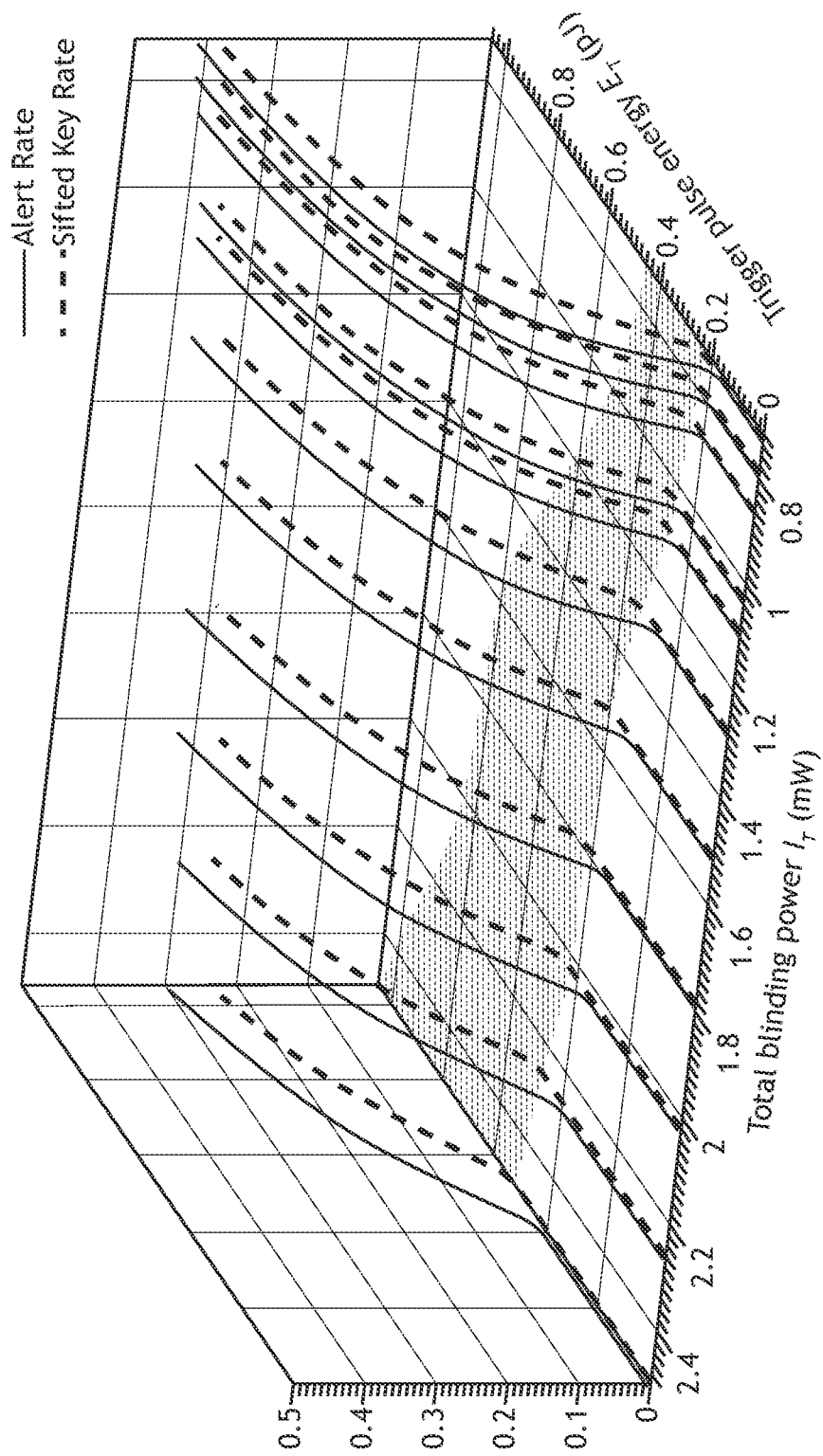
FIG. 7 is a plot of alert and sifted key rates for the configuration of the QKD system in FIG. 3, in accordance with one or more embodiments of the present disclosure.

Referring now to FIGS. 6-7, another way to demonstrate the immunity of the QKD system 100 to a detector-blinding attack is by comparing alert and sifted-key rates.

FIG. 6 is a plot of alert and sifted key rates for the configuration of the QKD system 100 in FIG. 2A, in accordance with one or more embodiments of the present disclosure. These alert and key rates are the probabilities that Eve's trigger pulse (under detector blinding attack) will initiate an alert count or a key bit, respectively. The rates are determined at values of total blinding power $I_T = \{0.78, 1.02, 1.27, 1.51, 1.78, 2.02, 2.27, 2.5\}$ mW striking the input of the transceiver 102 according to the non-limiting example of using the detectors of the commercial "Clavis 2" system as the detectors 116 in the configuration of the QKD system 100 shown in FIG. 2A. The rates are plotted versus the total trigger pulse energy $E_T$ and the total blinding power $I_T$. The rate values are obtained based on the first-order (ramp-step) approximation of the detector click probability (see Hegazy, S. F. et al., J. Lightwave Tech. 40, no. 21, pp. 6995 (2022), which is incorporated herein by reference in its entirety). The shaded area in FIG. 6 marks the space where blinding attacks become unnoticeable for conventional QKD systems (with no increase in the quantum bit error rate). The security of the QKD system 100 disclosed herein is verified by the nonzero alert rate, over all ranges of total blinding power $I_T$ and trigger energy $E_T$, whenever the sifted key rate has a value greater than zero. Therefore, the intruder (e.g., Eve) cannot trigger the QKD system 100 to share a key without elevating the alert counts.

FIG. 7 is a plot of alert and sifted key rates for the configuration of the QKD system 100 in FIG. 3, in accordance with one or more embodiments of the present disclosure. In particular, the alert rate and sifted key rate are plotted in FIG. 7 versus the total trigger pulse energy $E_T$ at values of total blinding power: $I_T = \{0.72, 0.78, 0.86, 1.02, 1.09, 1.27, 1.51, 1.78, 2.02, 2.26, 2.5\}$ mW using the non-limiting example of the detectors of commercial "Clavis 2" system as the detectors 116 in the configuration of the QKD system 100 shown in FIG. 3. The main result is similar to that shown in FIG. 6. The security is similarly verified by the nonzero alert rate, over all ranges of blinding power $I_T$ and trigger energy $E_T$, whenever the sifted key rate has a value greater than zero. Therefore, for the two configurations, Eve cannot maintain the normal QKD transfer between Alice and Bob at any rate without elevating the alert rate.

It follows that, for both configurations shown in FIGS. 2 and 3, it is impossible for Eve to launch a camouflaged attack that successfully avoids triggering the associated alert detectors 116, neither in presence nor in absence of the detectors gate, no matter the state of a faked-state pulse. However, it is to be understood that FIGS. 2-7 and the associated descriptions are provided solely for illustrative purposes and should not be interpreted as limiting. For example, the state randomizer 104 may randomize any state (e.g., any one or more degrees of freedom) of the faint pulse 106. The teachings of the present disclosure may be understood by one of ordinary skill in the art to extend to a state randomizer 104 that randomizes any state (e.g., any one ore degrees of freedom) of the faint pulse 106 and any variations of the associated components suitable for implementing secure QKD generation.

Figure 8:
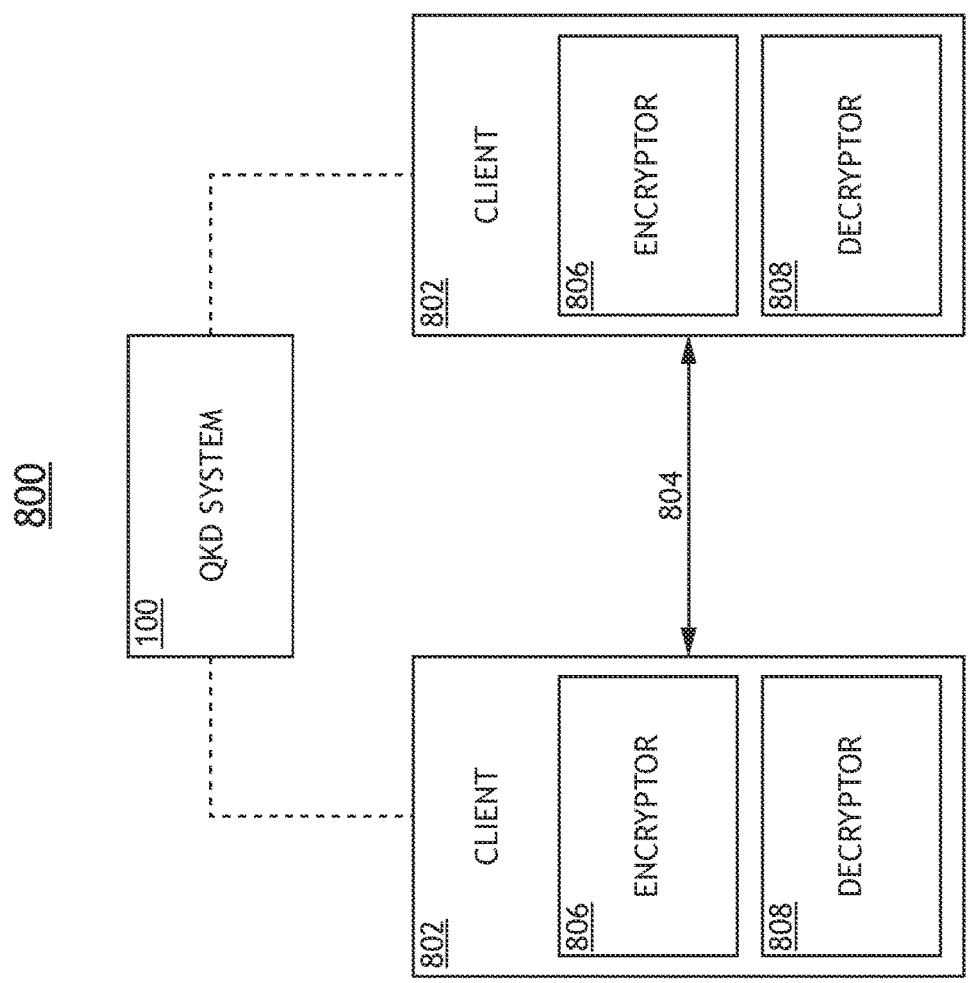
FIG. 8 is a block diagram of a communication system including a QKD system for generating a key and clients for communicating data encrypted (and decrypted) based on the key, in accordance with one or more embodiments of the present disclosure.

Referring now to FIG. 8, the use of a QKD system 100 for secure generation is described in greater detail, in accordance with one or more embodiments of the present disclosure.

FIG. 8 is a block diagram of a communication system 800 including a QKD system 100 for generating a key (e.g., an encryption key) and clients 802 for communicating data encrypted (and decrypted) based on the key, in accordance with one or more embodiments of the present disclosure.

The communication system 800 may include any combination of components suitable for one-directional or bi-directional communication. In some embodiments, the communication system 800 includes various clients 802 configured to communicate over a public communication channel 804. Any client 802 may include any combination of a transmitter, a receiver, or a transceiver. Further, any client 802 may include an encryptor 806 and/or a decryptor 808 suitable for encrypting and/or decrypting communication using a key. In this way, the client 802 may transmit and/or receive encrypted communications over the public communication channel 804.

The public communication channel 804 may include any communication channel known in the art. Further, signals transmitted over the public communication channel 804 may have any form including, but not limited to, electrical signals, wireless signals, or optical signals. In this way, the public communication channel 804 may include any combination of electrical cables, optical cables (e.g., fiber optic cables), antennas, or the like. The public communication channel 804 may further include various intermediate components such as, but not limited to, repeaters, hubs, or switches. In some embodiments, the public communication channel 804 operates as a network.

In some embodiments, the QKD system 100 generates and/or distributes a key for use by the clients 802 (e.g., by the associated encryptor 806 and/or decryptor 808). The communication system 800 may generally utilize encryption keys using any communication technique known in the art including, but not limited to, the BB84 protocol. In some embodiments, the QKD system 100 periodically generates an updated key, which may improve security over a configuration with a static key.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a transceiver comprising:
   a light source configured to generate a faint pulse;
   a state randomizer configured to impart a random state transformation to one or more qubits associated with the faint pulse prior to transmission of the faint pulse over a communication channel;
   a quantum bit encoder comprising:
   a modulator configured to encode one or more encoded bits on the faint pulse received over the communication channel; and
   a mirror to reflect the faint pulse back to the transceiver;
   wherein the transceiver is further configured to receive a return pulse through the communication channel, wherein the state randomizer is configured to apply an inverse of the random state transformation to the return pulse;
   wherein the transceiver further comprises a set of two detectors configured to measure the return pulse associated with possible paths of the return pulse through the transceiver;
   wherein reception of the faint pulse from the quantum bit encoder as the return pulse triggers a detector in the set of two detectors in one or more known time-gated timeslots determined based on the random state transformation imparted by the state randomizer; and
   wherein reception of a faked-state pulse from a third party as the return pulse results in a non-zero probability of triggering of a detector in the set of two detectors in a different time-gated timeslot.

2. The system of claim 1, wherein the transceiver further comprises:
   a state converter configured to convert the faint pulse from a first state of one or more degrees of freedom of the faint pulse to a second state, wherein the state randomizer applies the random state transformation to the second state of the faint pulse.

3. The system of claim 1, wherein the transceiver further comprises:
   a state converter including an interferometer, wherein the state converter is configured to convert the faint pulse from a polarization-path state to a time-polarization state with a leading time bin and a lagging time bin, wherein the state randomizer comprises a polarization randomizer to receive the faint pulse from the state converter, wherein the polarization randomizer applies a random polarization transformation to the faint pulse.

4. The system of claim 3, wherein the modulator comprises:
   a phase modulator configured to apply a differential phase shift between the leading time bin and the lagging time bin of the faint pulse as the one or more encoded bits.

5. The system of claim 4, wherein the state converter includes a polarization converter in an arm of the interferometer to rotate light within the arm to an orthogonal polarization.

6. The system of claim 4, wherein the state converter includes an additional phase modulator in one arm of the interferometer, wherein the additional phase modulator leaves the faint pulse from the light source to be transmitted to the quantum bit encoder unchanged, wherein the additional phase modulator imparts a phase shift between the leading time bin and the lagging time bin of the return pulse.

7. The system of claim 6, wherein the phase shift imparted by the additional phase modulator is associated with an encoding basis, wherein the phase shift is one of 0 or $\pi$ on a first basis and one of $\pi/2$ or $3\pi/2$ on a second basis, wherein the encoding basis is one of the first basis or the second basis.

8. The system of claim 7, wherein the transceiver determines an encoded bit of the one or more encoded bits provided by the quantum bit encoder if a measurement basis matches the encoding basis used by the phase modulator in the quantum bit encoder.

9. The system of claim 7, wherein the set of two detectors are configured to measure polarization in a diagonal basis relative to the encoding basis.

10. The system of claim 4, wherein the transceiver determines an encoded bit of the one or more encoded bits provided by the quantum bit encoder based on which detector in the set of two detectors is triggered along with an associated one of the known time-gated timeslots.

11. The system of claim 10, wherein at least one of the transceiver or the quantum bit encoder utilize the encoded bit when generating an encryption key.

12. The system of claim 11, wherein at least one of the transceiver or the quantum bit encoder utilize the encoded bit when generating the encryption key using a BB84 protocol.

13. The system of claim 4, wherein the mirror is a Faraday mirror, wherein the Faraday mirror rotates a polarization of the faint pulse to an orthogonal state.

14. The system of claim 4, wherein the polarization randomizer is a reciprocal polarization randomizer with a continuum of possible random realizations based on a Haar measure.

15. The system of claim 4, wherein the polarization randomizer maintains the random polarization transformation during a round-trip time of the faint pulse between the transceiver and the quantum bit encoder.

16. The system of claim 4, wherein the polarization randomizer provides the random polarization transformation for a set of time windows, wherein constituent windows in the set of time windows are separated by a round-trip time of the faint pulse between the transceiver and the quantum bit encoder and synchronized with the transmission of the faint pulse by the transceiver.

17. The system of claim 16, wherein the polarization randomizer provides additional polarization transformations for additional sets of time windows, wherein the constituent windows in the set of time windows are separated by the round-trip time, where the additional sets of time windows are synchronized to additional faint pulses transmitted by the transceiver.

18. The system of claim 4, wherein the transceiver further includes a polarization switch between the polarization randomizer and the state converter, wherein the polarization switch leaves a polarization of the faint pulse to be transmitted to the quantum bit encoder unchanged, wherein the polarization switch applies an additional random polarization transformation to the faint pulse, wherein the additional random polarization transformation includes one of passing the faint pulse unmodified or rotating polarization by 90 degrees.

19. The system of claim 1, further comprising:
a circulator to receive the faint pulse from the light source and direct the faint pulse to the state randomizer, wherein the circulator further receives the return pulse from the state randomizer along at least one of the possible paths and directs the return pulse to at least one of the set of two detectors.

20. The system of claim 1, further comprising:
an optical attenuator to decrease an intensity of light provided by the light source to provide the faint pulse.

21. A system comprising:
a quantum key distribution (QKD) system comprising:
a transceiver comprising:
a light source configured to generate a faint pulse;
a state randomizer configured to impart a random state transformation to one or more qubits associated with the faint pulse prior to transmission of the faint pulse through a communication channel;
a quantum bit encoder comprising:
a modulator configured to encode an encoded bit on the faint pulse received through the communication channel; and
a mirror to reflect the faint pulse back to the transceiver;
wherein the transceiver is further configured to receive a return pulse through the communication channel, wherein the state randomizer is configured to apply an inverse of the random state transformation to the return pulse;
wherein the transceiver further comprises a set of two detectors configured to measure the return pulse at time-gated timeslots associated with possible paths of the return pulse through the transceiver;
wherein reception of the faint pulse from the quantum bit encoder as the return pulse triggers a detector in the set of two detectors in one or more known time-gated timeslots determined based on the random state transformation imparted by the state randomizer; and
wherein reception of a faked-state pulse from a third party as the return pulse results in a non-zero probability of triggering of a detector in the set of two detectors in a different time-gated timeslot;
wherein the transceiver determines the encoded bit based on which detector in the set of two detectors is triggered along with an associated one of the known time-gated timeslots; and
wherein the faint pulse is one of a series of faint pulses, wherein encoded bit is one of a series of encoded bits associated with the series of faint pulses, wherein at least one of the transceiver or the quantum bit encoder generate an encryption key based on the series of encoded bits;
a first client to encrypt data based on the encryption key and transmit the encrypted data across an additional communication channel; and
a second client to decrypt data received over the communication channel based on the encryption key.

* * * * *